United States Patent [19]

Leach et al.

[11] Patent Number: 4,676,928

[45] Date of Patent: Jun. 30, 1987

[54] PROCESS FOR PRODUCING WATER DISPERSIBLE ALUMINA

[75] Inventors: Bruce E. Leach; Lewis B. Decker, Jr., both of Ponca City, Okla.

[73] Assignee: Vista Chemical Company, Ponca City, Okla.

[21] Appl. No.: 824,187

[22] Filed: Jan. 30, 1986

[51] Int. Cl.$^4$ .............................................. C01F 7/02
[52] U.S. Cl. .................................. 252/313.1; 423/630
[58] Field of Search ....................... 423/625, 626, 630; 252/313.1

[56] References Cited

U.S. PATENT DOCUMENTS 3,268,295 8/1966 Armbrust et al. .................. 423/626
3,411,876 11/1968 Michel et al. ...................... 423/626
3,411,877 11/1968 Michel et al. ...................... 423/626
3,997,476 12/1976 Cull .................................... 423/626
4,211,667 7/1980 Yamada et al. .................... 423/626
4,532,072 7/1985 Segal ................................. 252/313.1

*Primary Examiner*—John Doll
*Assistant Examiner*—Robert L. Stoll
*Attorney, Agent, or Firm*—Browning, Bushman, Zamecki & Anderson

[57] ABSTRACT

A process of producing a water dispersible alumina comprising forming an aqueous alumina slurry, acidifying the slurry to a pH range of from about 5 to about 8, aging the acidified slurry at elevated temperatures and for a sufficient amount of time to convert the greater portion of the alumina to a colloidal sol, recovering the sol and drying the sol to produce a highly water dispersible alumina.

11 Claims, No Drawings

PROCESS FOR PRODUCING WATER DISPERSIBLE ALUMINA

BACKGROUND OF THE INVENTION

1. Field of the Invention

The present invention relates to the production of alumina and, more particularly, to the production of alumina which is highly water dispersible.

2. Description of the Prior Art

Alumina, as is well known, has widespread commercial usage in such applications as abrasives, frictionizing paper surfaces, fiberglass surfaces and metal surfaces, as static and soil protection agents on wool, nylon and acrylic carpets, and as dispersing agents in rug shampoos, etc. In such commercial usages, the alumina is typically utilized as a dispersion or suspension, the alumina being present in an aqueous acid solution having a pH generally in the range of from about 2 to about 4, the acid serving to act as a peptizing agent.

The low pH values of the alumina dispersions is necessitated by the fact that the dispersions tend to gel in a pH range of above 4 which, in the case of alumina dispersions, is generally considered to be a neutral range. Indeed, it is well known that many aluminas will not disperse to any acceptable degree using low levels of acids, i.e. high pH values of 4 or above. This is also true of alumina slurries whose dispersion is dependent upon the pH and hence the level of acidity of the slurry.

The necessity of having to use such high acidities in forming stable dispersions of alumina, i.e. dispersions that will not gel, poses significant problems. For one, it is known that aluminas contain trace amounts of impurities which are sensitive to low pH values and which, under high acidic conditions, can affect the alumina properties. Moreover, it will be readily recognized that the high acidic alumina dispersions are corrosive and present handling and transportation problems.

It has also been found that certain alumina slurries, e.g. those derived from Ziegler Chemistry, are essentially unpumpable if the alumina content exceeds about 12% by weight. It will be readily recognized that if the alumina slurry could be concentrated to contain a higher percentage of alumina and still remain a pumpable, free flowing material, shipping costs could be significantly reduced.

SUMMARY OF THE INVENTION

It is therefore an object of the present invention to provide a water dispersible alumina.

Another object of the present invention is to provide a water dispersible alumina using a minimum amount of acid.

Yet another object of the present invention is to provide a dried alumina colloidal sol which is highly water dispersible.

A further object of the present invention is to provide a pumpable, free-flowing alumina slurry having an alumina content of greater than about 12% by weight.

The above and other objects of the present invention will become apparent from the description given herein and the appended claims.

In accordance with the above objects, the present invention provides a method of producing a water dispersible alumina by forming an aqueous alumina slurry, acidifying the alumina slurry to produce a slurry-acid composition having a pH of from about 5 to about 9, aging the slurry-acid composition at elevated temperatures for a period of time sufficient to convert the greater portion of the alumina to a colloidal sol and recovering and drying the colloidal sol.

In another aspect of the present invention, there is produced a pumpable, alumina sol by forming an aqueous alumina slurry, acidifying the slurry to produce a slurry-acid composition having a pH of from about 5 to about 9, aging the slurry-acid composition at elevated temperatures for a period of time sufficient to convert the greater portion of the alumina to a colloidal sol and recovering the colloidal sol.

DESCRIPTION OF THE PREFERRED EMBODIMENT

The aluminas which can be treated according to the process of the present invention include so-called pseudoboehmite aluminas and boehmite aluminas. Such aluminas are commonly obtained by the hydrolysis of aluminum alkoxide in the well known fashion. The aluminum trialkoxide (alkoxide) can be produced, in the well known manner, by reacting a low molecular weight alcohol, particularly a branched chain alcohol, with an aluminum bearing material. Such aluminum bearing materials include pure aluminum as well as aluminum alloys and mixed alloy scrap. Typical methods for preparing such aluminum alkoxides are shown, for example, in U.S. Pat. No. 4,242,271, incorporated herein by reference for all purposes. The aluminum alkoxide can be hydrolyzed, in the well known manner, such as by the process taught in U.S. Pat. No. 4,202,870, incorporated herein by reference for all purposes. Especially preferred are aluminas obtained from the hydrolysis of aluminum alkoxides derived from Ziegler Chemistry in the well known manner. While the preferred feedstock is an alumina slurry, particularly a slurry produced by the hydrolysis of aluminum alkoxides, it will be recognized that aluminas from other sources can be formed into slurries and treated according to the process of the present invention.

In the process, the alumina slurry is first formed. This can be accomplished by dispersing an alumina in an aqueous medium. Preferably, as noted, the alumina slurry is one which has been obtained as the product of the hydrolysis of an aluminum alkoxide. Basically, when the aluminum alkoxide is hydrolyzed, there is formed an alumina hydrate plus the starting material alcohol from which the alkoxide was originally formed. Removal of the alcohol leaves an alumina slurry which can vary considerably in properties such as pH, alumina content, etc., but which in the case of aluminum alkoxides produced or derived from Ziegler Chemistry will generally be characterized by an alumina content of 9 to 15% by weight, usually 10 to 11.5% by weight and have a pH greater than about 9, usually ranging from about 9 to about 10.

The alumina slurry is treated with an acid to reduce the pH of the slurry to about 9 to about 5. Generally, this acidification of the alumina slurry is carried out with monobasic acids such as nitric acid, hydrochloric acid, formic acid, acetic acid, and so forth. The particular type of acid used depends, to a certain extent, upon the type of alumina contained in the slurry. However, it has been found that when dealing with an alumina slurry obtained from the hydrolysis of an aluminum alkoxide derived from Ziegler Chemistry, nitric acid is preferred. In admixing the acid with the alumina slurry, it is desirable that there be sufficient mixing to avoid gel formation in the slurry-acid mixture. It will be appreciated that the amount of acid added to the slurry will depend upon the initial pH of the slurry, the alumina content of the slurry, the type of acid employed, the total amount of slurry, etc. For example, in the case of an alumina slurry having an alumina content of between 10 and 11.5% by weight with a pH of from about 9 to about 10, it is generally necessary, when using nitric acid, to use approximately 15–500 ml of 70% nitric acid for 50 gallons of alumina slurry. It will be appreciated that the concentration of the acid used in the acidification step is not critical.

Once the alumina slurry has been adjusted to the desired pH range, i.e. from about 5 to about 9, the slurry is then aged at elevated temperatures until the greater portion of the alumina is in the form of a colloidal sol. Usually about 95 to 99% by weight of the alumina is converted to the colloidal sol form. The aging can be carried out in any manner such as in an oven, pressure vessel, etc. Generally speaking, the aging will result in a product which contains from about 1 to about 4% of undispersed alumina, i.e. alumina which is not in the form of colloidal sol. The amount of time required to convert the alumina to the colloidal sol varies with pH and temperature. While temperatures of from about 70° to about 100° C. are preferred when the process is conducted at ambient pressures, it will be recognized that temperatures greater than 100° C. can be used quite successfully if the process is conducted under superatmospheric pressure. Indeed, in commercial operations, it is more desirable that higher temperature and pressures be employed in the aging step.

While it has been found that the pH of the aged colloidal sol decreases, it still remains above about 4 which, as noted above, is considered to be neutral in terms of acid dispersions of alumina.

The alumina sol is then recovered as by decantation or any other method well known to those skilled in the art and can either be transported as is for further processing into dried alumina or, it can be concentrated by removal of water to provide a concentrated colloidal sol which is pumpable and contains greater than about 12% by weight alumina. It has been found that with the process of the present invention, even though the alumina content of the concentrated sol exceeds about 12% by weight, the sol remains a low viscosity, easily pumpable medium. This is in contrast to alumina slurries which are not treated in accordance with the process of the present invention and which are generally unpumpable if the alumina content exceeds about 12% by weight.

The dried alumina sol obtained from the fluid colloidal sol is, for practical purposes, completely water dispersible, i.e. greater than 98% dispersible, whereas without the treatment of the present invention from about 90 to about 95% of the alumina will remain undispersible.

To more fully illustrate the present invention, the following non-limiting examples are presented. In the following examples, the alumina slurry was obtained from the hydrolysis of an aluminum alkoxide produced by Ziegler Chemistry. The alkoxide groups had carbon chains ranging from $C_2$ to $C_{20}$ and greater.

EXAMPLE 1

One quart of alumina slurry was adjusted to pH 5.60 with 3.9% $HNO_3$. The final slurry concentration contained 7.93% by weight $Al_2O_3$. The slurry was aged two weeks at 90° C. The pH of the colloidal sol was 4.8 after the two week aging period. A part of the colloidal sol was concentrated so as to result in a 10% by weight $Al_2O_3$ content. The concentrated sol was a low viscosity dispersion. Another part of the colloidal sol was dried at 170° F. The water dispersibility of the dried powder was found to be 99.8%. By comparison, an untreated alumina slurry aged at room temperature and dried at 170° F. had a water dispersibility of about 13.8% by weight.

EXAMPLE 2

One quart of alumina slurry was adjusted to a pH of 6.52 with 3.93% by weight nitric acid. The slurry was aged for two weeks at 90° C. resulting in a colloidal sol having a pH of 5.36 in which greater than 95% by weight of the alumina was converted to a colloidal sol. Dried alumina powder obtained from the colloidal sol was tested for water dispersibility as follows: 6.0 g of alumina powder was added to 53.4 g of water. After stirring for ten minutes, it was found that 99.65% of the alumina was water dispersible and could not be removed from solution by centrifugation.

EXAMPLE 3

500 ml of alumina slurry was adjusted to a pH of 8.2 with 20% by weight nitric acid. The slurry was placed in an autoclave and heated in a roller oven at 300° F. for four hours. The product, comprising a colloidal sol, was removed from the autoclave and dried at 160° F. overnight. Water dispersibility of the dried powder recovered from the colloidal sol was found to be 90.2% by weight.

EXAMPLE 4

500 ml of alumina slurry having a pH of 9.8 was aged at 350° F. for 16 hours. The product was cooled and removed from the autoclave. The alumina slurry was dried at 160° F. overnight. It was found that the dried alumina product had a water dispersibility of only about 9.2% by weight. It can be seen from this example that aging alone, even at elevated temperatures, is not sufficient to form a water dispersible alumina.

EXAMPLE 5

Four samples of alumina slurry were adjusted to four different pH values. These slurries were then aged 18 hours at 250° F. The slurries were dried at 160° F. to obtain dried alumina powder. The alumina powder thus obtained had the following properties:

TABLE I

| Sample # | 164-1 | 163-1 | 163-2 | 163-3 |
|---|---|---|---|---|
| Slurry pH | 9.8 | 7.0 | 6.4 | 5.8 |
| POWDER PROPERTIES | | | | |
| Water Dispersability (%) | 9.2 | 99.1 | 99.2 | 99.5 |
| Surface area (m²/g) | 208 | 208 | 229 | 227 |
| Cumulative pore volume (cc/g) | 0.68 | 0.57 | 0.53 | |

As can be seen from the data in Table I, the process of the present invention provides an alumina with markedly better water dispersibility and other powder properties than an alumina which is not so treated (Sample 164-1).

EXAMPLE 6

Three samples of alumina slurry were adjusted to various pH values. The slurries were then aged for five hours at 250° F. (including heat-up time). The aluminas produced had the following properties:

TABLE II

| Sample # | 163-4 | 163-5 | 163-6 |
|---|---|---|---|
| Slurry pH | 7.0 | 6.4 | 5.8 |
| POWDER PROPERTIES | | | |
| Water Dispersability (%) | 97.3 | 97.9 | 98.3 |
| Surface area (m$^2$/g) | 278 | 244 | 280 |
| Cumulative pore volume (cc/g) | 0.49 | 0.51 | 0.51 |

As can be seen from Table II, even with an aging time of five hours, water dispersibility of alumina produced according to the present invention is quite high.

EXAMPLE 7

Three samples of alumina slurry were adjusted to various pH values and aged for three hours in an autoclave in a roller oven set at 350° F. The alumina slurries were cooled and dried at 160° F. The alumina powder produced had the following properties:

TABLE III

| Sample # | 166-3 | 166-4 | 166-5 |
|---|---|---|---|
| Slurry pH | 9.8 | 6.95 | 6.00 |
| POWDER PROPERTIES | | | |
| Water Dispersability (%) | 5.8 | 97.4 | 99.4 |
| Surface Area (m$^2$/g) | 176 | 181 | 205 |
| Crystalline Size | | | |
| 020(A) | 59 | 54 | 45 |
| 021(A) | 109 | 97 | 86 |
| Pore Volume (cc/g) | 0.59 | 0.52 | 0.43 |

EXAMPLE 8

An alumina slurry was adjusted to pH 6.3 with nitric acid. The slurry was aged at 300° F. for five hours resulting in a colloidal sol, greater than 95% by weight of the alumina being converted to the sol. Following aging, the material was dried at 160° F. resulting in an alumina with a crystallite size, 020A; reflection 51; 021A, reflection 91. The water dispersibility of duplicate runs on the alumina powder ranged from 99.5 to 99.9% by weight.

EXAMPLE 9

The aged slurry from Example 8, which contained greater than 95% by weight alumina in the form of a colloidal sol, was concentrated so as to result in an alumina content of greater than about 15% by weight. The concentrated sol remained a pumpable, free-flowing dispersion.

EXAMPLE 10

15 gallons of alumina slurry were adjusted to a pH of 8.6 with 50 ml of 10% HNO$_3$. The slurry was aged for 3 hours and 4 hours at 350°. The pH of the colloidal sols were 7.7 (3 hours) and 7.4 (4 hours). The sols were dried overnight at 160° F. Water dispersibility of the dried powders were 94% for the 3-hour sample and 97% for the 4-hour sample. The pH of the water dispersions was 7.3.

EXAMPLE 11

Four samples of LCCP alumina slurry were adjusted to pH 6.4 with different acids. These slurries were aged at 190° F. for upwards of one month. The product was dried at 160° F. Water dispersibility is high on all samples.

| | SAMPLE VO-190: | | | |
|---|---|---|---|---|
| # | 44-1 | 44-2 | 44-3 | 44-4 |
| Acid | HCl | HNO$_3$ | Acetic | Formic |
| Water Dispersability | 97.0 | 99.0 | 98.5 | 98.0 |

The foregoing disclosure and description of the invention is illustrative and explanatory thereof, and various changes in the method steps may be made within the scope of the appended claims without departing from the spirit of the invention.

What is claimed is:

1. A process of producing a water dispersible alumina comprising:
   forming an aqueous alumina slurry from an uncalcined alumina obtained from the hydrolysis of an aluminum alkoxide;
   admixing a monovalent acid with said alumina slurry to produce an alumina slurry-acid composition having a pH of from about 5.0 to about 9.0;
   aging said alumina slurry-acid composition at an elevated temperature of above about 70° C. and for a period of time sufficient to convert the greater portion of said alumina to a colloidal sol;
   recovering said colloidal sol; and
   drying said colloidal sol.

2. The process of claim 1 wherein said alumina slurry has an alumina content of from about 9 to about 15% by weight.

3. The process of claim 1 wherein the pH of said alumina slurry prior to addition of said acid is about 9 or greater.

4. The process of claim 1 wherein said acid comprises nitric acid.

5. The process of claim 1 including concentrating said colloidal sol by removing water therefrom.

6. A process for producing a pumpable, alumina sol comprising:
   forming an aqueous alumina slurry from an uncalcined alumina obtained from the hydrolysis of an aluminum alkoxide;
   admixing a monovalent acid with said alumina slurry to produce an alumina slurry-acid composition having a pH of from about 5.0 to about 9.0; and
   aging said alumina slurry-acid composition at an elevated temperature of above about 70° C. and for a period of time sufficient to convert the greater portion of said alumina to a colloidal sol.

7. The process of claim 6 including recovering said colloidal sol.

8. The process of claim 6 wherein said alumina slurry has an alumina content of from about 9 to about 15% by weight.

9. The process of claim 1 wherein the pH of said alumina slurry prior to addition of said acid is about 9 or greater.

10. The process of claim 6 wherein said acid comprises nitric acid.

11. The process of claim 6 including concentrating said colloidal sol by removing water therefrom.

* * * * *